W. S. HADAWAY, Jr.
FLUID METER.
APPLICATION FILED JAN. 29, 1918.
1,291,489.
Patented Jan. 14, 1919
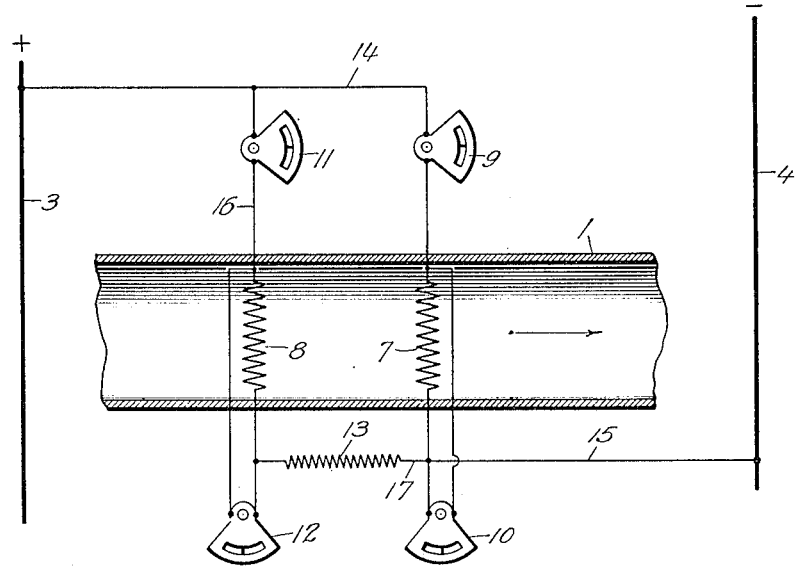
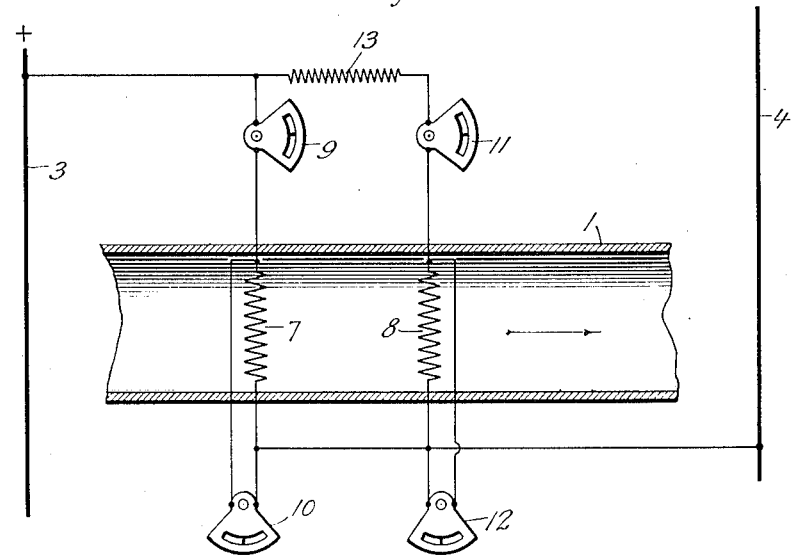
Inventor
William S. Hadaway Jr.

UNITED STATES PATENT OFFICE.

WILLIAM S. HADAWAY, JR., OF NEW ROCHELLE, NEW YORK, ASSIGNOR TO THE CUTLER-HAMMER MFG. CO., OF MILWAUKEE, WISCONSIN, A CORPORATION OF WISCONSIN.

FLUID-METER.

1,291,489.     Specification of Letters Patent.     Patented Jan. 14, 1919.

Original application filed December 26, 1912, Serial No. 738,644. Divided and this application filed January 29, 1918. Serial No. 214,327.

*To all whom it may concern:*

Be it known that I, WILLIAM S. HADAWAY, Jr., a citizen of the United States, residing at New Rochelle, in the county of Westchester and State of New York, have invented new and useful Improvements in Fluid-Meters, of which the following is a specification.

This invention relates to fluid meters.

My co-pending application Serial No. 738,644 filed December 26th, 1912, discloses a method of and apparatus for measuring the rate of flow of a fluid by imparting heat to the fluid by means of a heater and utilizing the cooling effect of the fluid on the heater in determining the rate of flow of the fluid.

The present application is a division of the above mentioned application and specifically covers a species of the invention disclosed, but not specifically claimed, in said application.

One object of this invention is to provide an improved method of measuring the rate of flow of a fluid.

Another object is to provide a method of correctly measuring the rate of flow of a fluid regardless of its temperature, by utilizing the cooling effect of the fluid on a heater.

Another object is to provide an apparatus in which the methods herein disclosed may be carried out.

The invention is illustrated in the accompanying drawing in which—

Figure 1 is a diagrammatic representation of a fluid meter constructed in accordance with the invention.

Fig. 2 is a diagrammatic representation of a slightly different form of meter constructed in accordance with the invention.

The meter comprises in general a conduit through which the fluid to be measured flows. Arranged in the conduit are two resistors, one of which serves as a heater for imparting heat to the fluid, and the other of which serves as a thermometer resistance. Suitable instruments are associated with both of the resistors to obtain readings from which can be obtained both the resistance value of the resistors and the electrical energy consumed by the resistors. The rate of flow of the fluid may be determined from the readings taken from these instruments in the manner to be hereinafter described.

In Fig. 1 the conduit through which the fluid to be measured flows is shown at 1. A resistance 7 is located in the conduit and is supplied with current from the mains 3 and 4 by means of the conductors 14 and 15. An ammeter 9 is connected in series with the resistance 7 and a voltmeter 10 is connected across the resistance 7. The ohmic resistance of the resistor 7 may therefore be determined at any time by taking readings from the ammeter 9 and voltmeter 10 and determining therefrom the resistance value. Furthermore, by reading the ammeter 9 and the voltmeter 10 the wattage consumed by the heater 7 may be readily determined.

The material of which the resistance 7 is made is such that its resistance varies with its temperature. Preferably it is a material having a positive temperature co-efficient.

In advance of the resistor 7 there is located a second resistor 8 whose resistance also varies with its temperature. Current may be supplied to the resistor 8 by means of the conductors 16 and 17, the ammeter 11 serving to measure the value of the current and a voltmeter 12 serving to measure the voltage across the resistor. The value of the current supplied to the resistor 8 is reduced by means of a resistance 13. This resistance has no effect upon the resistor 7. The arrangement is such that the current passing through the resistor 8 will not heat the resistor sufficiently to cause it to impart an appreciable amount of heat to the fluid. The resistor will therefore assume approximately the same temperature as the fluid. The current supplied to the resistor 7, however, is sufficient to cause this resistor to serve as a heater and impart heat to the fluid. The resistor 8 therefore serves as a thermometer resistance and the resistor 7 serves as a heater resistance.

In Fig. 2 the heater and thermometer resistances are reversed, that is the heater resistance 7 is located in advance of the thermometer resistance 8. In this instance the resistance 13 is arranged so that it will not affect the value of the current passing through the resistor 7 but it will cut down the value of the current passing through the resistor 8. The resistor 7 therefore serves as the heater resistance and the resistor 8 serves as the thermometer resistance.

The apparatus above described may be used in various different ways for measuring the rate of flow of fluid regardless of the temperature of the incoming fluid.

In Fig. 1, for example, the heater 7 may be maintained at a temperature, which is higher by a constant amount than the temperature of the incoming fluid as indicated by the thermometer resistance 8, by varying the current supplied to the heater. The amount of energy necessary to maintain the heater at this temperature will then be an indication of the rate of flow of the fluid. This is true because the fluid flowing past the heater produces a cooling action thereon, the extent of which will depend upon the rate at which the fluid is flowing and upon the temperature of the incoming fluid. Now, if when the heater tends to change in temperature, as the rate of flow changes, the energy supplied to the heater is varied to keep the heater at a temperature which is higher by a constant amount than the temperature of the fluid, it is obvious that the energy consumed by the heater at any moment when the heater is at the predetermined temperature will be an indication of the rate of flow at that moment. This may be done by taking readings from the ammeter 9 and the voltmeter 10 and determining the ohmic resistance of the resistor 7. As the ohmic resistance of the resistor 7 varies with its temperature the resistor may be maintained at the proper temperature by maintaining its ohmic resistance at the predetermined value. The wattage consumed by the heater 7 when the latter is operating at its predetermined temperature may be readily determined from the readings taken from the ammeter 9 and the voltmeter 10. The temperature of the fluid when it reaches the meter is measured by the thermometer resistance 8. The ohmic resistance of the resistor 8 is determined from readings taken from the ammeter 11 and voltmeter 12 and this value will be an indication of the temperature of the incoming fluid. The heater 7 is maintained at a temperature or resistance value which is higher by a constant amount than the resistance value of the thermometer resistance 8. The temperature of the incoming fluid will therefore always be taken into account. The rate of flow may then be readily calculated or if desired a suitable calibration curve may be referred to from which the rate of flow of fluid may be obtained when the wattage consumed by the heater is known.

Instead of maintaining the heater 7 at a temperature which is higher by a constant amount than the temperature of the fluid, as described above, the wattage consumed by the heater may be maintained at a constant value and the ohmic resistance of the heater may be determined from the ammeter and voltmeter. This value will be an indication of the rate of flow of fluid, for if the energy supplied to the heater is maintained constant the temperature or the ohmic resistance of the heater will depend upon the rate at which the fluid is flowing, because the faster the fluid is flowing the greater will be the cooling effect upon the heater. This cooling effect, however, will also depend upon the temperature of the incoming fluid and therefore the above method will give the true rate of flow only if the temperature of the incoming fluid remains constant. In order to take into account the temperature of the incoming fluid the resistance value of the resistor 8 is determined from the readings taken from the ammeter 11 and voltmeter 12 and it is the difference between the resistance values of the heater 7 and the thermometer resistance 8 that is then used when the calibration curve is referred to. If desired instead of using the difference between the two resistance values the resistance value of the resistor 7 alone may be used and the resistance value of thermometer resistance 8 may indicate which one of a plurality of different curves should be referred to in determining the rate of flow of the fluid, such curves having been previously plotted for the different temperatures of the incoming fluid.

The apparatus shown in Fig. 2 may be used in the same way as described above to determine the rate of flow of the fluid. The only difference between these figures is that in Fig. 2 the thermometer resistance 8 is placed at the rear of the heater 7 instead of in advance thereof. The thermometer resistance 8 will therefore measure the temperature of the fluid after it is heated instead of measuring the temperature of the incoming fluid. However the fluid is heated such a slight amount by the heater that the resistance value of thermometer resistance 8 may be considered as a measure of the temperature of the incoming gas without introducing serious errors in the results.

There have been described two general methods by which the rate of flow of the fluid may be determined by utilizing the temperature effect of the fluid on the resistors. These methods briefly stated are as follows:

First, the energy supplied to the heater may be varied to maintain the heater at a temperature which is higher by a constant amount than the temperature of the thermometer resistance. The rate of flow at any moment may then be obtained by determining the wattage of the heater at that moment and then referring to a suitable curve from which the rate of flow can be read directly when the wattage of the heater is known.

Second, the energy supplied to the heater may be maintained constant. Then the rate of flow at any moment may be obtained by determining the difference in temperature or resistance between the heater and the thermometer resistance and referring to a suitable calibration curve from which the rate of flow may be directly read when this difference in temperature is known. Or, the temperature of the heater may be determined and the temperature of the thermometer resistance may be used as an indication of which one of a plurality of different curves should be referred to, such curves having been previously plotted for different temperatures of the incoming fluid.

What I claim is:

1. The method of measuring the flow of fluids which consists in separately determining the resistance values of two resistors having resistances which are variable in accordance with their temperatures, one of which is heated to a temperature higher than that of the fluid being measured and is subjected to the cooling action of the fluid and the other of which is maintained by contact with the fluid at substantially the temperature of the fluid, and then utilizing said resistance values in determining the rate of flow of the fluid.

2. The method of measuring the flow of fluids which consists in separately determining and then comparing the resistance values of two resistors having resistances which are variable in accordance with their temperatures, one of which is heated to a temperature higher than that of the fluid being measured and is subjected to the cooling action of the fluid and the other of which is maintained by contact with the fluid at substantially the temperature of the fluid.

3. The method of measuring the flow of fluids which consists in determining the resistance values of two resistors having resistances which are variable in accordance with their temperatures, one of which is heated to a temperature higher than that of the fluid being measured and is subjected to the cooling action of the fluid and the other of which is maintained by contact with the fluid at substantially the temperature of the fluid, and utilizing said resistance values in determining the rate of flow of the fluid.

4. The method of measuring the flow of fluids by means of two resistors having resistances which are variable in accordance with their temperatures, one of which is heated to a temperature higher than that of the fluid being measured and is subjected to the cooling action of the fluid and the other of which is maintained by contact with the fluid at the temperature of the fluid, which consists in utilizing the temperature effect upon both of said resistors in determining the rate of flow of the fluid.

5. The method of measuring the rate of flow of fluids which consists in subjecting a heater resistance and a thermometer resistance to the action of the fluid to be measured and utilizing the temperature effect upon said resistors in determining the rate of flow of the fluid.

6. The method of measuring the rate of flow of fluids which consists in subjecting two resistors to the action of the fluid to be measured, measuring the current through each resistor and the voltage across each resistor and from the readings obtained determining the rate of flow of the fluid.

7. The method of measuring the rate of flow of fluids which consists in subjecting a heater resistance and a thermometer resistance to the action of the fluid to be measured, determining the wattage consumed by the heater resistance and also the resistance value thereof, determining the resistance value of the thermometer resistance and then determining the rate of flow from these known values.

8. Apparatus for measuring the flow of fluids through a conduit comprising two electrical resistors having resistances which are variable in accordance with their temperatures and arranged in the conduit, means for passing an electric current through one of said resistors to heat the same, and means for separately determining the resistance values of said resistors.

9. Apparatus for measuring the flow of fluids through a conduit comprising two electrical resistors having resistances which are variable in accordance with their temperatures arranged in the conduit, means for passing an electric current through one of said resistors to heat the same, and an ammeter and a voltmeter electrically connected with each resistor.

10. Apparatus for measuring the flow of fluids comprising an electrical resistor for heating the fluid, a thermometer resistor, means for determining the resistance of one of the resistors and the value of the energy supplied thereto and separate means for determining the resistance of the other resistor.

11. Apparatus for measuring the flow of fluids comprising a pair of resistors, one of which serves as a heater and the other as a thermometer resistance and means whereby the temperature effect of the fluid upon said resistors may be utilized in determining the rate of flow of the fluid.

12. The method of measuring the rate of flow of fluids which consists in causing a heat transfer at a constant rate between the fluid and a body, and utilizing the temperature effect on said body in determining the rate of flow of the fluid.

13. The method of measuring the rate of flow of fluids which consists in subjecting a heating element and a thermometer element to the action of the fluid to be measured and utilizing the temperature effect upon said elements in determining the rate of flow of the fluid.

In witness whereof, I have hereunto subscribed my name.

WILLIAM S. HADAWAY, Jr.